United States Patent [19]

Sommer

[11] Patent Number: 5,680,915

[45] Date of Patent: Oct. 28, 1997

[54] BRAKE AND CLUTCH CONTROL SYSTEM

[75] Inventor: Gordon Maurice Sommer, Grosse Pointe Shores, Mich.

[73] Assignee: Midwest Brake Bond Company, Warren, Mich.

[21] Appl. No.: 594,136

[22] Filed: Jan. 31, 1996

[51] Int. Cl.$^6$ ................................................ F16D 67/04
[52] U.S. Cl. .............. 192/12 C; 192/18 A; 192/109 F; 60/436; 60/494
[58] Field of Search ...................... 192/18 A, 12 C, 192/85 R, 109 F, 52.4; 60/427, 436, 494; 91/519

[56] References Cited

U.S. PATENT DOCUMENTS

| | | | |
|---|---|---|---|
| 2,636,581 | 4/1953 | Bitler | 192/18 A |
| 3,135,289 | 6/1964 | Jordan | 192/12 C |
| 3,602,135 | 8/1971 | Monnin | 192/12 C X |
| 3,730,313 | 5/1973 | Luenser | 192/12 C |
| 3,833,100 | 9/1974 | Aschauer | . |
| 4,456,109 | 6/1984 | Bottomley et al. | . |
| 4,580,674 | 4/1986 | Weber | . |

*Primary Examiner*—Richard M. Lorence
*Attorney, Agent, or Firm*—Harness, Dickey & Pierce

[57] ABSTRACT

A press includes a drive system which includes a brake and a clutch operated by fluid pressure. The brake and clutch control the movement of a crankshaft in relation to a flywheel. A unique control system supplies the pressurized fluid for operation of the brake and clutch. The unique control system includes a pressure relief valve for defining a maximum fluid pressure and a plurality of valve modules which each define a specific fluid pressure. Each valve module is selectively movable between a relief condition and a blocked condition. Thus, by selectively operating the valve modules, it is possible to select the fluid pressure being supplied to the brake and clutch.

28 Claims, 4 Drawing Sheets

BRAKE AND CLUTCH CONTROL SYSTEM

FIELD OF THE INVENTION

The present invention relates to a control system for a press incorporating a clutch and a brake. More particularly, the present invention relates to a unique control valve system which operates to provide the clutch and the brake of the press with soft starting, running, soft braking and harsh braking capabilities as well as the necessary inching and emergency stopping features.

BACKGROUND OF THE INVENTION

It is well known in the prior art to provide a press with a clutch system and a brake system to provide for driving a crankshaft or the like for operating the press. Presses of this type generally have the crankshaft intermittently driven through the clutch by a continuously running flywheel or gear. The crankshaft of the machine may be operated in several different ways depending on the manner in which the press is being used and the type of work it is performing. The mode of operation most generally employed is to intermittently drive the crankshaft through one cycle, stopping it at the same point after each cycle of movement. The movement of the crankshaft is controlled by the clutch which connects and disconnects the crankshaft and the flywheel as desired, and a brake which stops the movement of the crankshaft upon the disengagement of the clutch. The control of the clutch and brake are normally interconnected in such a manner that the brake will be released simultaneously with the engagement of the clutch and vice versa although some applications may require a controlled overlap between the operation of the clutch and the brake. The system for controlling the clutch and the brake is normally a hydraulic and/or electrical apparatus which is operated manually or automatically to effect the engagement of the clutch and the release of the brake to begin the cycle and normally operated automatically to effect the disengagement of the clutch and the application of the brake to end the cycle.

The brake is normally biased into an applied condition while the clutch is normally biased to a disengaged condition. Thus, in order to start the cycle by engaging the clutch and releasing the brake, fluid pressure is provided to an actuator for the clutch and the brake to overcome the load of the biasing members to release the brake and engage the clutch to drive the flywheel. Likewise, in order to stop the cycle, the fluid pressure is released from the actuators to again allow the biasing members to apply the brake and disengage the clutch. The rate of application and release of the fluid pressure is one factor which determines both the smoothness of operation of the press and the overall durability of the press.

In a typical press application, the press is in a full braking mode prior to beginning a cycle. Full braking mode means that the fluid pressure is at a minimum value to allow the biasing members to apply the brake and disengage the clutch. Typical minimum fluid pressure is from 25 psi to 50 psi. This minimum fluid pressure within the clutch and brake at all times enables the fine tuning of the harshness of the operation of the press and ensures that air will not be introduced into the hydraulic system once the system has been bled. The controlling system will begin the cycle using a "soft starting" which initiates the movement of the crankshaft. Typical fluid pressure used for "soft starting" is 350 psi. The "soft starting" lasts for a specified amount of rotation, typically 45° of a 360° cycle, and/or a time period, typically one-fourth to one-half second after which full system pressure is applied to the clutch and the brake to engage the clutch and release the brake. Typical system fluid pressure used is 475 psi. The stopping of the cycle begins with a "soft braking" which initiates the stopping of the crankshaft by first slowing it down. Typical fluid pressure utilized for the "soft braking" condition is 160 psi. This "soft braking" condition begins just prior to the actual stoppage of the crankshaft or at a position equal to approximately 320° of the 360° cycle. The "soft braking" lasts for a specified amount of rotation, typically 30° of the 360° cycle and/or a specific time period, typically one-half second. The "soft braking" phase ends with the application of a "harsh braking" phase which occurs by the reduction of the pressurized fluid back to its original minimum fluid pressure which as stated above, is from 25–50 psi. The press is now positioned back at its start position, ready to begin an additional cycle.

The continued development of presses and their controlling systems is directed toward the simplification of the control system while at the same time increasing the reliability of the system and lowering the overall costs associated with the system.

SUMMARY OF THE INVENTION

The present invention provides the art with a unique control system for a press which has the capability of applying the various fluid pressures to the clutch and the brake at the appropriate time. The system includes a system pressure relief valve and three similar valve modules which are mounted on a common block or manifold. Each valve module functions as a combination relief valve and a 2-way valve. The valve modules are controlled by a 4-way single solenoid with a spring offset. The system pressure relief valve working in conjunction with the three valve modules provide the appropriate system pressure for "soft starting", normal running, "soft braking" and "harsh braking" phases for the operation of the clutch and the brake of the press.

Other advantages and objects of the present invention will become apparent to those skilled in the art from the subsequent detailed description, appended claims and drawings.

BRIEF DESCRIPTION OF THE DRAWINGS

In the drawings which illustrate the best mode presently contemplated for carrying out the present invention.

DETAILED DESCRIPTION OF THE PREFERRED EMBODIMENT

Figure 1:
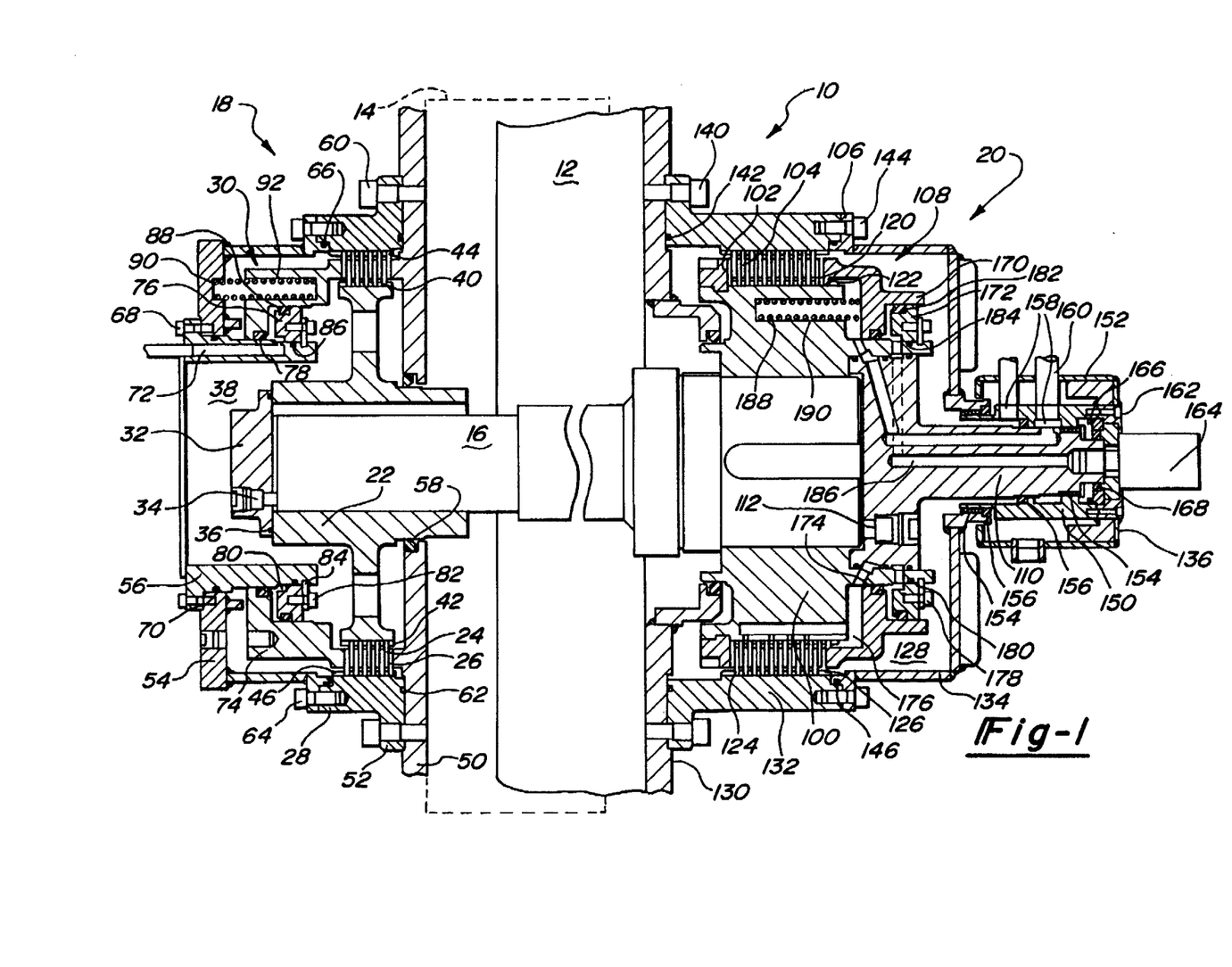
FIG. 1 schematically illustrates a press incorporating a brake and a clutch which are controlled using the control system according to the present invention.

Referring now to the drawings in which like reference numerals designate like or corresponding parts throughout the several views, there is shown in FIG. 1 a press 10 incorporating a rotatable flywheel 12, a stationary member 14, a rotatable crankshaft 16, an oil-shear brake assembly 18 and an oil-shear clutch assembly 20.

Brake assembly 18 includes a brake reaction hub 22, a plurality of brake friction plates 24, a plurality of brake reaction plates 26, a brake housing assembly 28 and a brake engagement assembly 30. Brake reaction hub 22 is drivingly connected to crankshaft 16 of press 10. An end cap 32 is fixedly secured to crankshaft 16 using a plurality of bolts 34. A seal 36 disposed between hub 22 and end cap 32 helps to maintain an oil tight chamber 38 within housing assembly 28 as will be described later herein. Chamber 38 is supplied with cooling oil for oil-shear brake assembly 18 by methods known well in the art.

The plurality of brake friction plates 24 have spline means 40 located on their interior surface for engagement with spline means 42 disposed on the exterior of hub 22. This spline engagement between plates 24 and hub 22 is such that plates 24 and hub 22 will rotate together but plates 24 are allowed to move axially along spline means 42. Interjected or interleaved between the plurality of brake friction plates 24 are the plurality of brake reaction plates 26. Brake reaction plates 26 have spline means 44 located on their exterior surface for the engagement with spline means 46 disposed on the interior of housing assembly 28. The engagement between plates 26 and housing assembly 28 is such that plates 26 are prohibited from rotating with respect to housing assembly 28 but plates 26 are allowed to move axially along spline means 46 of housing assembly 28.

Housing assembly 28 in conjunction with crankshaft 16 defines chamber 38. Housing assembly 28 includes a gearcase adapter plate 50, a brake reaction member 52, a housing cover 54 and a housing cap 56. Adapter plate 50 is fixedly secured to stationary member 14 of press 10 or any other non-moving member adjacent to press 10. A seal 58 located between adapter plate 50 and crankshaft 16 maintains the oil tightness of chamber 38. Brake reaction member 52 is fixedly and sealingly secured to adapter plate 50 with a plurality of bolts 60 or by other means known well in the art. A seal 62 between plate 50 and reaction member 52 maintains the oil tightness of chamber 38. Reaction member 52 includes spline means 46, and positions spline means 46 generally co-axial with spline means 44 such that plates 26 and plates 24 are positioned in their interleaved relationship. Housing cover 54 is fixedly and sealingly secured to reaction member 52 using a plurality of bolts, 64 or by other means known well in the art. A seal 66 between cover 54 and reaction member 52 maintains the oil tightness of chamber 38. For exemplary purposes, housing cover 54 is shown in FIG. 1 as being comprised of multiple pieces welded together. Housing cap 56 is fixedly and sealing secured to cover 54 by a plurality of bolts 68. A seal 70 between cap 56 and cover 54 maintains the oil tightness of chamber 38. For exemplary purposes, housing cap 56 is shown in FIG. 1 as being a multiple piece assembly. A fluid passage 72 extends through housing cap 56 to provide for the application and release of brake assembly 18 as will be described later herein.

Brake engagement assembly 30 is disposed within sealed chamber 38 defined by housing assembly 28 and crankshaft 16. Brake engagement assembly 30 comprises an application member 74 and an annular stationary plate 76. Application member 74 is slidingly received over housing cap 56 and moves axially along cap 56 in order to apply or release brake assembly 18. A seal 78 is disposed between cap 56 and application member 74 in order to isolate an activation chamber 80 from chamber 38. Stationary plate 76 is disposed between cap 56 and application member 74, and with member 74 and cap 56 define chamber 80. Stationary plate 76 is fixedly secured to cap 56 using a plurality of bolts 82 and a plurality of retainers 84. A seal 86 is disposed between plate 76 and cap 56 to isolate chamber 80 from chamber 38. A second seal 88 is disposed between plate 76 and application member 74 to complete the isolation of chamber 80 from chamber 38. Chamber 80 is isolated from chamber 38 with the only access to chamber 80 being through passage 72. A plurality of coil springs 90 are disposed within a plurality of bores 92 extending into application member 74. Springs 90 extend between housing cover 54 and application member 74 in order to urge brake assembly 18 into the engaged condition.

The operation of brake assembly 18 begins with brake assembly 18 being in the applied condition due to the biasing of application member 74 by the plurality of coil springs 90. Application member 74 compresses the plurality of friction plates 24 and the plurality of reaction plates 26 together and against adapter plate 50. In this applied position, rotation of crankshaft 16 is prohibited by the fact that brake reaction hub 22, which is locked to crankshaft 16, is locked to adapter plate 50 which is in turn secured to stationary member 14. When it is desired to release brake assembly 18, fluid under pressure is supplied to chamber 80 through passage 72. Pressurized fluid within chamber 80 causes application member 74 to move axially to the left as shown in FIG. 1 against the biasing of coil springs 90. When application member 74 moves to the left, the compression between the plurality of friction and reaction plates 24 and 26, respectively, is released and plates 24 are free to rotate relative to plates 26 which allows crankshaft 16 to rotate. When the pressurized fluid is released from chamber 80, brake assembly 18 is urged into its applied condition due to the biasing of coil springs 90.

Clutch assembly 20 includes a clutch reaction hub 100, a plurality of clutch friction plates 102, a plurality of clutch reaction plates 104, a clutch housing assembly 106 and a clutch engagement assembly 108. Clutch reaction hub 100 is drivingly connected to crankshaft 16 of press 10. An end cap 110 is fixedly secured to crankshaft 16 using a plurality of bolts 112. End cap 110 extends through clutch housing assembly 106 to provide access for the attachment of the various fluid lines required for the operation of press 10 as will be described later herein.

The plurality of clutch friction plates 102 have spline means 120 located on their interior surface for the engagement with spline means 122 located on the exterior surface of hub 100. This spline engagement between plates 102 and hub 100 is such that plates 102 and hub 100 will rotate together but plates 102 are allowed to move axially along spline means 122. Interjected or interleaved between the plurality of clutch friction plates 102 are the plurality of clutch reaction plates 104. Clutch reaction plates 104 have spline means 124 located on their exterior surface for the engagement with spline means 126 disposed on the interior of housing assembly 106. The engagement between plates 104 and housing assembly 106 is such that plates 104 are prohibited from rotating with respect to housing assembly 106 but plates 104 are allowed to move axially along spline means 126 of housing assembly 106.

Housing assembly 106 in conjunction with crankshaft 16 defines a sealed chamber 128. Housing assembly 106 includes a flywheel adapter plate 130, a clutch reaction member 132, a housing cover 134 and a housing cap assembly 136. Adapter plate 130 is fixedly secured to flywheel 12 of press 10. Clutch reaction member 132 is fixedly and sealingly secured to adapter plate 130 by a plurality of bolts 140 or by other means known well in the art. A seal 142 between plate 130 and reaction member 132 maintains the oil tightness of chamber 128. Reaction member 132 includes spline means 126, and positions spline means 126 generally co-axial with spline means 124 such that plates 104 and plates 102 are positioned in their interleaved relationship. Housing cover 134 is fixedly and sealingly secured to reaction member 132 using a plurality of bolts 144 or by other means known well in the art. A seal 146 between cover 134 and reaction member 132 maintains the oil tightness of chamber 128. For exemplary purposes, housing cover 134 is shown in FIG. 1 as being comprised of multiple pieces welded together.

Housing cap assembly 136 is rotatably supported by end cap 110 of clutch reaction member 100 and comprises a center hub 150 for interfacing with end cap 110 and a protective cover 152. Center hub 150 is rotatably supported on end cap 110 by a pair of bearings 154. A pair of seals 156 maintain the oil tightness of chamber 128. A pair of ports 158 extend through center hub 150 to provide for the attachment of fluid lines 160 which allow for the entrance and exit of oil to oil-shear clutch assembly 20. Protective cover 152 is fixedly secured to center hub 150 by a plurality of bolts 162 or by other means known well in the art. Cover 152 provides for the connection of a fluid line 164 for the engagement and release of clutch assembly 20 as will be described later herein. A seal 166 located between cover 152 and center hub 150, and a seal 168 located between cover 152 and end cap 110 maintain the oil tightness of chamber 128.

Clutch engagement assembly 108 is disposed within sealed chamber 128 defined by housing 106 and crankshaft 16. Clutch engagement assembly 108 comprises an application member 170 and an annular stationary plate 172. Application member 170 is slidingly received over hub 100 and moves axially along hub 100 in order to engage and release clutch assembly 20. A seal 174 is disposed between hub 100 and application member 170 in order to isolate an activation chamber 176 from chamber 128. Stationary plate 172 is disposed between hub 100 and application member 170, and with member 170 and hub 100 define chamber 176. Stationary plate 172 is fixedly secured to hub 100 using a plurality of bolts 178 and a plurality of retainers 180. A seal 182 is disposed between plate 172 and hub 100 to isolate chamber 176 from chamber 128. A second seal 184 is disposed between plate 172 and application member 170 to complete the isolation of chamber 176 from chamber 128. Chamber 176 is isolated from chamber 128 with the only access to chamber 176 being through a passage 186 extending through end cap 110 to connect chamber 176 with fluid line 164 which extends through cover 152. A plurality of coil springs 188 are disposed within a plurality of bores 190 extending into hub 100. Springs 188 extend between hub 100 and application member 170 in order to urge clutch assembly 20 into a disengaged condition.

The operation of clutch assembly 20 begins with clutch assembly 20 being in the disengaged condition due to the biasing of application member 170 by the plurality of coil springs 188 to cause application member 170 to move away from friction plates 102 and reaction plates 104. In this released position, flywheel 12 is free to rotate with respect to crankshaft 16 due to the fact that the plurality of friction plates 102 are free to rotate relative to the plurality of reaction plates 104. When it is desired to power crankshaft 16 by flywheel 12, fluid under pressure is supplied to chamber 176 through passage 186. Pressurized fluid within chamber 176 causes application member 170 to move axially to the left as shown in FIG. 1 against the biasing of coil springs 188. When application member 170 moves to the left, the plurality of friction plates 102 are urged against the plurality of reaction plates 104 causing engagement of clutch assembly 20 and the transferring of power from flywheel 12 to drive crankshaft 16. When the pressurized fluid is released from chamber 176, clutch assembly 20 is urged into its released condition due to the biasing of coil springs 188.

Figure 2:
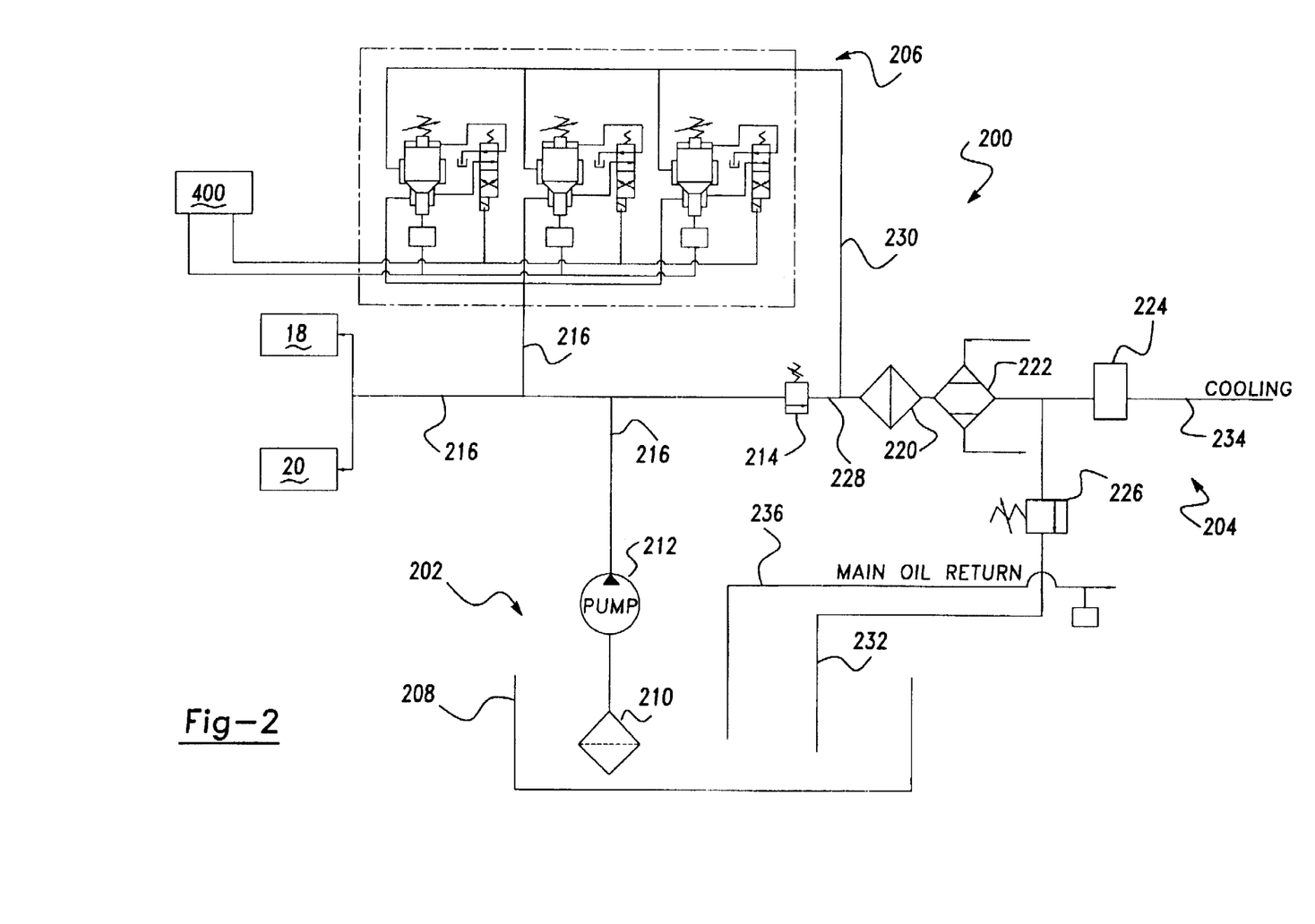
FIG. 2 schematically illustrates the clutch and brake shown in FIG. 1 incorporating the control system of the present invention.

FIG. 2 schematically illustrates a control system 200 in accordance with the present invention which controls the application/release of brake assembly 18 and the engagement/disengagement of clutch assembly 20. Control system 200 comprises a pressurized fluid supply system 202, a cooling system 204 and a unique valve module system 206.

Pressurized fluid supply system 202 is a typical system which includes a tank 208, a strainer 210, a pump 212 and a system pressure relief valve 214. Pump 212 pumps hydraulic fluid from tank 208 to brake assembly 18, clutch assembly 20, valve module system 206 and pressure relief valve 214 through fluid lines 216. Pressure relief valve 214 maintains the maximum system pressure which in the preferred embodiment is 475 psi. Supply system 202 is well known in the art and will not be discussed further herein.

Cooling system 204 includes a filter 220, a heat exchanger 222, a flow switch 224 and a pressure relief valve 226. Cooling system 204 receives oil from supply system 202 through relief valve 214 and a fluid line 228. Additional oil is received from valve module system 206 through a fluid line 230. Heat exchanger 222 cools the oil and returns a portion to tank 208 through a fluid line 232 and returns the remaining oil to clutch assembly 20 and brake assembly 18 through a fluid line 234. Fluid line 234 supplies cooling oil to sealed chamber 38 of brake assembly 18 and to sealed chamber 128 of clutch assembly 20. Oil is returned to tank 208 from chambers 38 and 128 through a fluid line 236. The flow of fluid to sealed chamber 38 of brake assembly 18 and clutch sealed chamber 128 of assembly 20 is controlled by flow switch 224 and the fluid pressure in chambers 38 and 128 is maintained by relief valve 226. Cooling system 204 is well known in the art an will not be discussed further herein.

Figure 3:
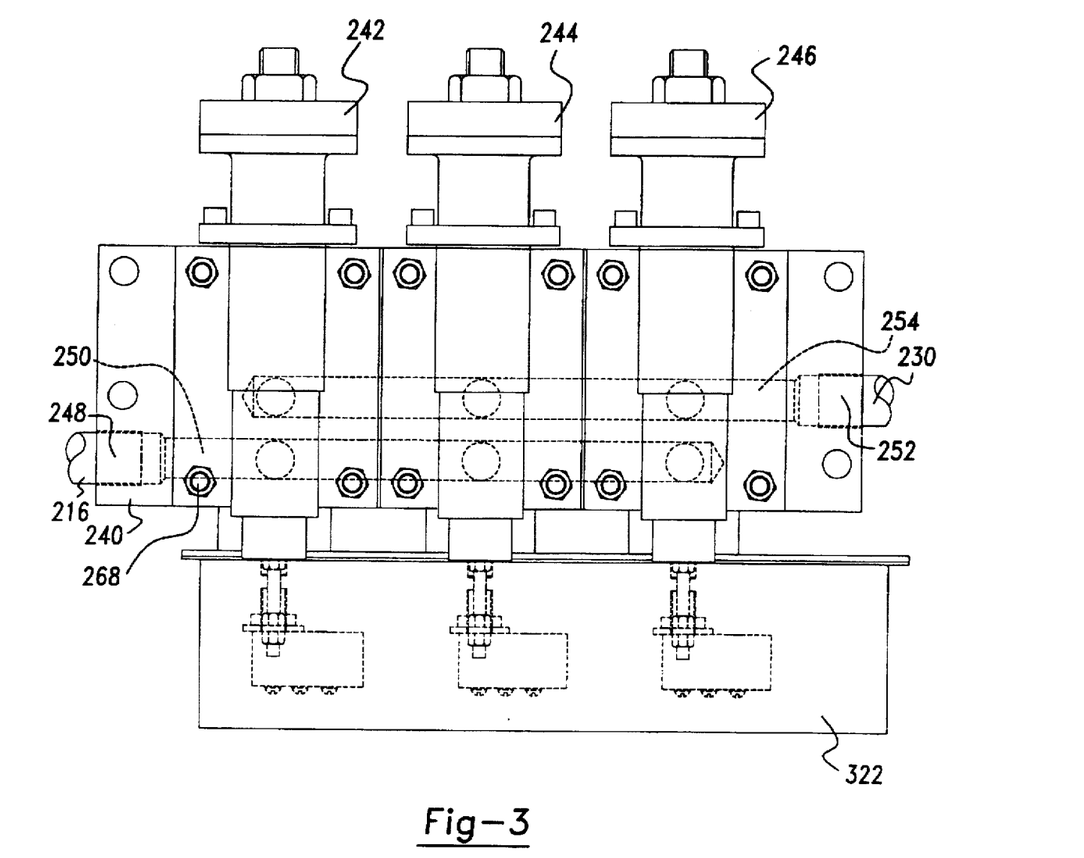
FIG. 3 illustrates the valve modules and manifold of the control system illustrated in FIG. 2.

Valve module system 206 is a unique system which controls the fluid pressure being supplied to brake assembly 18 and clutch assembly 20 to effect the operation of press 10. Referring now to FIG. 3, valve module system 206 comprises a manifold 240 and three valve modules 242, 244 and 246. Manifold 240 defines an input port 248 which provides access for fluid line 216 to supply pressurized fluid to an input passageway 250. Manifold 240 also includes an output port 252 which provides access for fluid line 230 to receive fluid from an output passageway 254 and direct this oil to cooling system 204.

Each valve module 242, 244 and 246 are mounted to manifold 240. The construction of each valve module 242, 244 and 246 is identical with the only difference between these modules being that the pre-load spring for each module is different as will be discussed later herein. Therefore only module 242 will be discussed herein and it is to be understood that modules 244 and 246 are identical except for the differences noted below.

Figure 4:
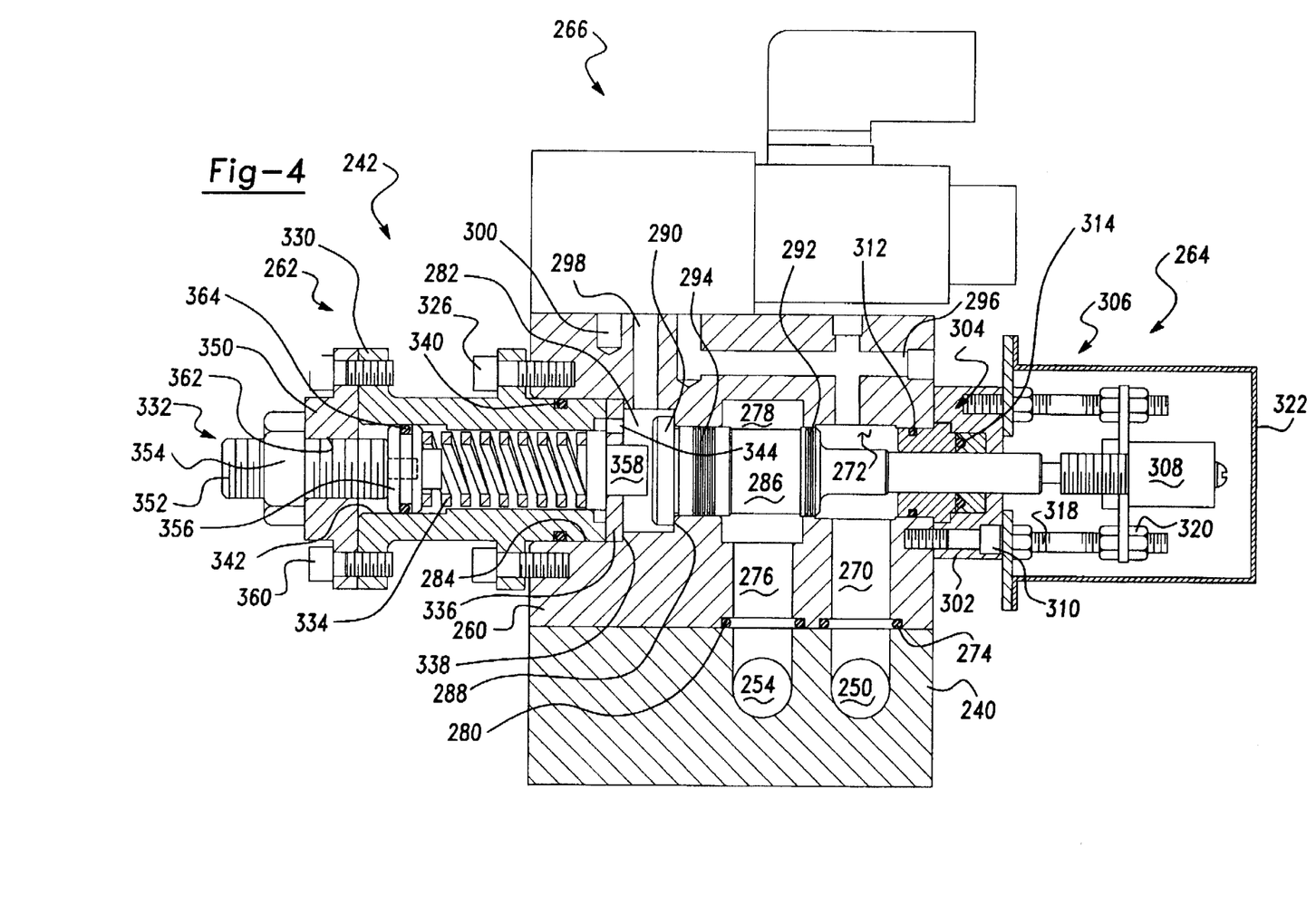
FIG. 4 is a cross sectional view illustrating a typical valve module shown in FIG. 3.

Referring now to FIGS. 3 and 4, Valve module 242 comprises a valve body 260, a relief pressure adjusting assembly 262, a monitor assembly 264 and a solenoid valve assembly 266. Valve body 260 is fixedly secured to manifold 240 by a plurality of bolts 268. Valve body 260 defines an input passage 270 extending between input passageway 250 of manifold 240 and an input chamber 272 formed within valve body 260. A seal 274 seals the interface between manifold 240 and valve body 260 around passageway 250 and passage 270. Valve body 260 also defines an output passage 276 extending between output passageway 254 of manifold 240 and an output chamber 278 formed within body 260. A seal 280 seals the interface between manifold 240 and valve body 260 around passageway 254 and passage 276. A pressure chamber 282 is formed within valve body 260 to receive pressurized fluid in order to selectively turn the relief feature of valve module on and off as will be described later herein.

A bore 284 extends through valve body 260 to and intersect with input chamber 272, output chamber 278 and pressure chamber 282. A valve spool 286 is disposed for axial movement within bore 284. The axial movement of valve spool 286 in one direction is restricted by a shoulder 288 formed into bore 284 which mates with an integral cap 290 of valve spool 286. The axial movement of valve spool 286 in the opposite direction is restricted by relief pressure adjusting assembly 262 as will be described later herein. A first set of seals 292 seal the interface between valve spool 286 and bore 284 at the location between input chamber 272 and output chamber 278. A second set of seals 294 seal the interface between valve spool 286 and bore 284 at the location between output chamber 278 and pressure chamber 282.

A first fluid passage 296 extends between input chamber 272 and solenoid valve assembly 266, a second fluid passage 298 extends between pressure chamber 282 and valve assembly 266 and a third fluid passage 300 extends between valve assembly 266 and the exterior of valve module 242 where it is routed back to tank 208 by the appropriate fluid lines (not shown).

Solenoid valve assembly 266 is fixedly secured to valve body 260 and operates to control the fluid flow between passages 296, 298 and 300. Valve assembly 266 is a standard 4-way single solenoid valve with spring offset and thus the details of valve assembly 266 will not be discussed herein. Valve assembly 266 operates between a de-energized condition where passage 296 is blocked and passage 298 is opened to passage 300 and thus to tank 208 and an energized condition where passage 296 is opened to passage 298 and passage 300 is blocked. When valve assembly 266 is de-energized, valve module 242 operates as a relief valve. When valve assembly 266 is energized, the relief feature of valve module 242 will be blocked as will be described later herein.

Monitor assembly 264 is fixedly secured to valve body 260 of valve module 242 in line with bore 284. Assembly 264 comprises an adaptor plate 302, a sealing system 304, an adjustment system 306 and a switch 308. Adaptor plate 302 is fixedly secured to valve body 260 by a plurality of bolts 310. Sealing system 304 includes a first seal 312 disposed within bore 284 and a second seal 314 disposed within adaptor plate 302. An actuating rod 316 extends through seal 312, seal 314 and adaptor plate 302 to allow monitor assembly 264 to monitor the movement of valve spool 286 by switch 308. Adjustment system 306 comprises a pair of threaded studs 318 threadingly received by adaptor plate 302 and a plurality of nuts 320 threadingly received by studs 318. Switch 308 is mounted to studs 318 and axially positioned with respect to bore 284 and actuating rod 316 by nuts 320. The position of switch 308 is adjusted such that when valve spool 286 moves in an axial direction such that cap 290 engages shoulder 288, valve spool 286 contacts actuating rod 316 which in turn moves switch 308 to an open condition. When valve spool 286 moves in the opposite direction to engage relief pressure adjusting assembly 262, valve spool 286 no longer contacts actuating rod 316 and switch 308 moves to a closed condition. In the preferred embodiment, this movement is approximately one-sixteenth of an inch. Thus, monitor assembly 264 is capable of monitoring the position of valve spool 286 and thus the condition of valve module 242. A housing assembly 322 is fixedly secured to studs 318 by a plurality of bolts (not shown). Housing assembly 322 extends across the entire valve module system 208 to protect each switch 308 associated with valve modules 242, 244 and 246 as is shown in FIG. 3.

Relief pressure adjusting assembly 262 is fixedly secured to valve body 260 of valve module 242 in line with bore 284 but at the opposite end of bore 284 from monitor assembly 264 by a plurality of bolts 326. Assembly 262 comprises a housing 330 and an adjustment mechanism 332. Housing 330 is secured within bore 284 of valve body 260 by bolts 326. A washer 336 is positioned between housing 330 and a shoulder 338 of bore 264 in order to properly position housing 330 within bore 284. A seal 340 seals the interface between housing 330 and bore 284. Housing 330 defines an axial bore 342 within which a relief spring 334 and adjustment mechanism 332 are located. An aperture 344 within washer 336 allows fluid communication between bore 342 and pressure chamber 282 to ensure the proper function of adjusting assembly 262.

Adjustment mechanism 332 comprises a cover 350, a threaded adjustment bolt 352, a locknut 354, a first piston 356, a second piston 356 and relief spring 334. Cover 350 is secured to housing 330 by a plurality of bolts 360. Cover 350 defines a threaded bore 362 within which adjustment bolt 352 is threadingly received. The position of adjustment bolt 352 can be varied by rotating bolt 352 with respect to cover 350 to vary the axial position of bolt 352 within bore 362. Once the desired position of bolt 352 has been reached, locknut 354 can be tightened to lock bolt 352 in position. Piston 356 is connected to bolt 352 such that rotation of bolt 352 causes axial movement of piston 356 within bore 342. A seal 364 seals the interface between piston 356 and bore 342. Piston 356 is disposed within bore 342 and includes a portion slidingly received within bore 342 and a portion extending through washer 336 to engage valve spool 286 within pressure chamber 282. Relief spring 334 is positioned within bore 342 between pistons 356 and 356 to provide a biasing load to resist the movement of valve spool 286 within bore 284 as will be described later herein.

Valve module 242 functions as a relief valve having an on/off feature provided by solenoid valve assembly 266. When solenoid valve assembly 256 is de-energized, valve module 242 functions as a relief valve. In this mode, valve assembly 256 blocks fluid passage 296 and connects fluid passage 298 with fluid passage 300 and thus to tank 208. This fluid pressure is supplied to chamber 272 from passage 270, which is supplied fluid pressure from passageway 250, which is supplied fluid pressure from fluid lines 216. The fluid pressure within chamber 272 is thus equal to the system pressure within fluid lines 216 which is the fluid pressure being supplied to brake assembly 18 and clutch assembly 20. The fluid pressure within chamber 272 biases valve spool 286 towards relief pressure adjusting assembly 262. Valve spool 286 moves into contact with piston 358 and moves piston 358 against the load exerted by relief spring 334. This movement is caused by the pressurization of chamber 272 and the release of pressure within chamber 282 which is vented to tank 208. The pressure within chamber 272 builds until valve spool 286 compresses relief spring 334 to the point that fluid within chamber 272 is released to chamber 278. Chamber 278 is open to passage 276 which is open to passageway 254 and is routed to cooling system 204 through fluid line 230. This movement of valve spool 286 also operates to move valve spool 286 out of contact with actuating rod 316 of monitor assembly 264 allowing switch 308 to move to its closed position. This closed condition of switch 308 signals that valve module 242 is in its relief condition. Thus, valve module 242 acts as a pressure relief valve when solenoid valve assembly 266 is de-energized with the relief pressure being set by relief spring 334 of relief pressure adjusting assembly 262.

When it is desired to lock out the relief feature of valve module 242, solenoid valve assembly 266 is energized. This causes fluid passage 300 which is connected to tank 208 to be blocked and connects fluid passage 296 with fluid passage 298. Fluid pressure from fluid line 216 is directed through fluid passageway 250 to fluid passage 270 and in to inlet chamber 272. Fluid pressure is also routed through fluid passage 296 through solenoid valve assembly 266 and through fluid passage 298 to pressure chamber 282. Thus, system pressure from fluid line 216 is provided to both input chamber 272 and pressure chamber 282. Cap 290 of valve spool 286 is larger in diameter than the portion of valve spool 286 open to input chamber 272. Thus, when equal pressure (system pressure from fluid line 216) is supplied to both input chamber 272 and pressure chamber 282, valve spool 286 is biased away from relief pressure adjusting assembly 262 and towards monitor assembly 264 until cap 290 contacts shoulder 288. This movement causes valve spool 286 to engage actuating rod 316 of monitor assembly 264 urging switch 308 to move to its open position. This open position of switch 308 signals that valve module 242 is not in its relief condition. When cap 290 contacts shoulder 288, there is an approximately one-sixteenth inch gap between valve spool 286 and piston 358 of relief pressure adjusting assembly 262 in the preferred embodiment. This small amount of movement permits the movement of switch 308 between its closed and open conditions. Thus, valve module 242 has its pressure relief function blocked when solenoid valve assembly 266 is energized with the fluid pressure within pressure chamber 282 prohibiting the movement of valve spool 286 and the flow of fluid between input chamber 272 and output chamber 278.

As stated above, valve modules 242, 244 and 246 are identical except for the load exerted by relief spring 334 and thus the fluid pressure which can be maintained within the system. This difference in relief pressure can be adjusted by using the same relief spring 334 and relief pressure adjustment assembly 262 or this difference can be adjusted by using different relief springs 334 and assembly 262 depending on the range of pressures desired. Thus, valve modules 242, 244 and 246 provide three different relief pressures which will control the pressure of fluid within fluid line 216 and thus the fluid pressure being supplied to brake assembly 18 and clutch assembly 20. These three different relief pressures are in addition to the relief pressure for the system provided by relief valve 214.

Referring back to FIG. 2, the preferred embodiment is shown with relief valve 214 being set at 475 psi, valve module 242 being set at 350 psi, valve module 244 being set at 160 psi and valve module 246 being set at 50 psi. A single cycle begins with solenoid valve assemblies 266 of valve modules 242, 244 and 246 being de-energized. This positions all valve modules 242, 244 and 246 into their relief mode and system pressure which is being supplied to brake assembly 18 and clutch assembly 20 through fluid line 216 is at 50 psi due to the relief function of valve module 246. All fluid flow from pump 212 flows from fluid line 216 through valve module 246 to fluid line 230 because valve module 246 has the lowest relief pressure. Switch 308 of each valve module 242, 244 and 246 is closed signalling control means 400 the condition of control system 200.

Solenoid valve assemblies 266 of valve modules 244 and 246 are then energized by control means 400 to increase the system pressure from 50 psi to 350 psi to initiate a "soft start". This pressure is provided because with solenoid valve assemblies 266 of valve modules 244 and 246 energized, the relief feature of these valve modules is blocked leaving only relief valve 214 and valve module 242 as the only relief valves in the hydraulic system. All fluid flow from pump 212 flows from fluid line 216 through valve module 242 to fluid line 230 because it has the lowest relief pressure. The system pressure of 350 psi to brake assembly 18 and clutch assembly 20 through fluid line 216 begins the movement of crankshaft 16 by the partial release of brake assembly 18 and the partial engagement of clutch assembly 20 to provide a "soft start" for press 10.

At approximately 45 degrees of rotation of crankshaft 16 (assuming a cycle is 360°) or a time delay of approximately one-fourth to one-half of a second, solenoid valve assembly 266 of valve module 242 is energized by control means 400 to block the relief feature of the valve module. With the relief feature of valve modules 242, 244 and 246 being blocked, the system pressure to brake assembly 18 and clutch assembly 20 through fluid line 216 increases to 475 psi which is the relief pressure of relief valve 214, the only relief valve in the hydraulic system. All fluid flow from pump 212 through fluid line 216 flows through relief valve 214. The 475 psi system pressure in fluid line 216 fully releases brake assembly 18 and fully engages clutch assembly 20 and flywheel 12 is locked to crankshaft 16.

At approximately 320 degrees of rotation of crankshaft 16, solenoid valve assemblies 266 of valve modules 242 and 244 are de-energized by control means 400 to again place these valve modules into their relief mode. Thus, valve modules 242 and 244 along with relief valve 214 are the relief valves now in the hydraulic system. The system pressure in fluid line 216 drops to 160 psi which is the relief pressure of valve module 244 and the lowest value in the system. All fluid flow from pump 212 flows from fluid line 216 through valve module 244 to fluid line 230. The system pressure of 160 psi to brake assembly 18 and clutch assembly 20 through fluid line 216 begins the braking of crankshaft 16 by partially applying brake assembly 18 and partially disengaging clutch assembly 20 to produce a "soft braking" phase.

At approximately 350 degrees of rotation or after an approximately one-half second delay after the "soft braking" phase, solenoid valve assembly 266 of valve module 246 is de-energized again by control means 400 placing this valve module into its relief mode. Thus valve modules 242, 244 and 246 along with relief valve 214 are the relief valves now in the hydraulic system. The system pressure in fluid line 216 drops to 50 psi which is the relief pressure of valve module 246 and the lowest in the system. All fluid flow from pump 212 flows from fluid line 216 through valve module 246 to fluid line 230. The system pressure of 50 psi to brake assembly 18 and clutch assembly 20 through fluid line 16 finishes the braking of crankshaft 16 by fully applying brake assembly 18 and fully disengaging clutch assembly 20 to produce a "harsh braking" phase. It should be realized that this "harsh braking" phase also is the condition of control system 200 which is required to begin a new cycle. Also, it is to be understood that switch 308 of each valve module 242, 244 and 246 are moved between their open and closed positions during the cycling of press 10 to signal control means 400 the condition of control system 200.

Thus, the smooth operation of press 10 can be controlled by control system 200 by selectively energizing solenoid valve assemblies 266 of valve modules 242, 244 and 246 to apply a specific system fluid pressure to brake assembly 18 and clutch assembly 20 as specific times during a cycle of operation. The system fluid pressure is separately adjustable within each valve module 242, 244 and 246 using the respective relief pressure adjusting assembly 262.

While the above detailed description describes the preferred embodiment of the present invention, it should be understood that the present invention is susceptible to modification, variation and alteration without deviating from the scope and fair meaning of the subjoined claims.

What is claimed is:

1. A system for controlling fluid pressure within a fluid line, said system comprising:

means for defining a maximum fluid pressure within said fluid line;

a plurality of valve modules connected to said fluid line for defining said fluid pressure within said fluid line, each of said modules being movable between a pressure relief condition and a blocked condition, said pressure relief condition defining a specific fluid pressure within said fluid line; and control means for selectively moving each of said valve modules between said pressure relief condition and said blocked condition to select said fluid pressure within said fluid line.

2. The system according to claim 1 wherein, each of said valve modules comprises:

a valve body; and a relief pressure adjustment assembly secured to said valve body.

3. The system according to claim 2 wherein, said relief pressure adjusting assembly comprises:

a housing secured to said valve body;

a relief spring disposed within a bore defined by said housing, said relief spring being preloaded to define said specific fluid pressure; and an adjustment mechanism secured to said housing and extending into said bore, said adjustment mechanism adjustably preloading said relief spring to vary said specific fluid pressure.

4. The system according to claim 2 wherein, said control means comprises a solenoid valve assembly secured to said valve body.

5. The system according to claim 2 wherein, each of said valve modules further comprises a monitor assembly secured to said valve body, said monitor assembly indicating the condition of said valve module.

6. The system according to claim 1 wherein, said control means comprises a solenoid valve assembly secured to said valve module.

7. The system according to claim 1 wherein, each of said valve modules further comprises a monitor assembly secured to said valve module, said monitor assembly indicating the condition of said valve module.

8. The system according to claim 1 wherein, said means for defining a maximum fluid pressure comprises a pressure relief valve.

9. The system according to claim 1 wherein, each of said valve modules comprises:

a valve body defining a cavity extending through said valve body, an inlet passage for providing pressurized fluid to said cavity, an outlet passage for removing pressurized fluid from said cavity;

a valve spool slidingly disposed within said cavity and movable between said pressure relief condition and said blocked condition, said valve spool allowing fluid flow between said inlet passage and said outlet passage in said pressure relief condition, said valve spool prohibiting fluid flow between said inlet passage and said outlet passage in said blocked condition; and a relief pressure adjustment assembly secured to said valve body and extending into said cavity, said relief pressure adjustment assembly resisting movement of said spool from said blocked condition to said pressure relief condition to define said specific fluid pressure.

10. The system according to claim 9 wherein, said valve body further defines a pressure passage for supplying pressurized fluid to said cavity, said pressurized fluid from said pressure passage reacting against said valve spool to urge said valve spool into said blocked condition.

11. The system according to claim 9 wherein, said relief pressure adjusting assembly comprises:

a housing secured to said valve body;

a relief spring disposed within a bore defined by said housing, said relief spring being preloaded to define said specific fluid pressure; and an adjustment mechanism secured to said housing and extending into said bore, said adjustment mechanism adjustably preloading said relief spring to vary said specific fluid pressure.

12. The system according to claim 9 wherein, said control means comprises a solenoid valve assembly secured to said valve body.

13. The system according to claim 9 wherein, each of said valve modules further comprises a monitor assembly secured to said valve body, said monitor assembly indicating the condition of said valve module.

14. The system according to claim 9 wherein, said means for defining a maximum fluid pressure comprises a pressure relief valve.

15. A press comprising:

a flywheel rotatably disposed with respect to said frame;

a crankshaft rotatably disposed with respect to said frame;

a brake disposed between said frame and said crankshaft, said brake being movable by fluid pressure between an applied condition and a released condition, said crankshaft being locked to said frame when said brake is in said applied condition, said crankshaft being free to rotate with respect to said frame when said brake is in said released condition;

a clutch disposed between said crankshaft and said flywheel, said clutch being movable by fluid pressure between a disengaged condition and an engaged condition, said flywheel being free to rotate with respect to said crankshaft when said clutch is in said disengaged condition, said flywheel being locked to said crankshaft when said clutch is in said engaged condition;

a control system for supplying said fluid pressure to said brake and said clutch, said control system comprising:

a pressure fluid supply system;

means for defining a maximum fluid pressure for said supply system;

a plurality of valve modules for defining said fluid pressure being supplied to said brake and said clutch, each of said valve modules being movable between a pressure relief condition and a blocked condition, said pressure relief condition defining a specific fluid pressure being supplied to said brake and said clutch; and control means for selectively moving each of said valve modules between said pressure relief condition and said blocked condition to select said fluid pressure being supplied to said brake and said clutch.

16. The system according to claim 15 wherein, each of said valve modules comprises:

a valve body; and a relief pressure adjustment assembly secured to said valve body.

17. The system according to claim 16 wherein, said relief pressure adjusting assembly comprises:

a housing secured to said valve body;

a relief spring disposed within a bore defined by said housing, said relief spring being preloaded to define said specific fluid pressure; and an adjustment mechanism secured to said housing and extending into said bore, said adjustment mechanism adjustably preloading said relief spring to vary said specific fluid pressure.

18. The system according to claim 16 wherein, said control means comprises a solenoid valve assembly secured to said valve body.

19. The system according to claim 16 wherein, each of said valve modules further comprises a monitor assembly secured to said valve body, said monitor assembly indicating the condition of said valve module.

20. The system according to claim 15 wherein, said control means comprises a solenoid valve assembly secured to said valve module.

21. The system according to claim 15 wherein, each of said valve modules further comprises a monitor assembly secured to said valve module, said monitor assembly indicating the condition of said valve module.

22. The system according to claim 15 wherein, said means for defining a maximum fluid pressure comprises a pressure relief valve.

23. The system according to claim 15 wherein, each of said valve modules comprises:

a valve body defining a cavity extending through said valve body, an inlet passage for providing pressurized fluid to said cavity, an outlet passage for removing pressurized fluid from said cavity;

a valve spool slidingly disposed within said cavity and movable between said pressure relief condition and said blocked condition, said valve spool allowing fluid flow between said inlet passage and said outlet passage in said pressure relief condition, said valve spool prohibiting fluid flow between said inlet passage and said outlet passage in said blocked condition; and a relief pressure adjustment assembly secured to said valve body and extending into said cavity, said relief pressure adjustment assembly resisting movement of said spool from said blocked condition to said pressure relief condition to define said specific fluid pressure.

24. The system according to claim 23 wherein, said valve body further defines a pressure passage for supplying pressurized fluid to said cavity, said pressurized fluid from said pressure passage reacting against said valve spool to urge said valve spool into said blocked condition.

25. The system according to claim 23 wherein, said relief pressure adjusting assembly comprises:

a housing secured to said valve body;

a relief spring disposed within a bore defined by said housing, said relief spring being preloaded to define said specific fluid pressure; and an adjustment mechanism secured to said housing and extending into said bore, said adjustment mechanism adjustably preloading said relief spring to vary said specific fluid pressure.

26. The system according to claim 23 wherein, said control means comprises a solenoid valve assembly secured to said valve body.

27. The system according to claim 23 wherein, each of said valve modules further comprises a monitor assembly secured to said valve body, said monitor assembly indicating the condition of said valve module.

28. The system according to claim 23 wherein, said means for defining a maximum fluid pressure comprises a pressure relief valve.

* * * * *

UNITED STATES PATENT AND TRADEMARK OFFICE
CERTIFICATE OF CORRECTION

PATENT NO. : 5,680,915

DATED : October 28, 1997

INVENTOR(S) : Gordon M. Sommer

It is certified that error appears in the above-identified patent and that said Letters Patent is hereby corrected as shown below:

Col. 3, line 40, "bolts,64" should be --bolts 64--

Col. 3, line 63, "cap 56" should be --cap 56,--

Col. 6, line 34, before "assembly 20" insert --clutch--

Col. 6, line 38, "an" should be --and--

Col. 6, line 59, "Valve" should be --valve--

Col. 7, line 10, delete "and"

Col. 7, line 65, ".opposite" should be --opposite--

Col. 8, line 8, "system 208" should be --system 206--

Col. 8, line 18, "bore 264" should be --bore 284--

Col. 8, line 28, "piston 356" should be --piston 358--

Col. 8, line 39, "Piston 356" should be --Piston 358--

Col. 8, line 43, 2nd occurrence of "356" should be --358--

UNITED STATES PATENT AND TRADEMARK OFFICE
CERTIFICATE OF CORRECTION

PATENT NO. : 5,680,915

DATED : October 28, 1997

INVENTOR(S) : Gordon M. Sommer

It is certified that error appears in the above-identified patent and that said Letters Patent is hereby corrected as shown below:

Col. 8, line 48, "assembly 256" should be --assembly 266--

Col. 8, line 50, "assembly 256" should be --assembly 266--

Col. 11, line 7, "as" should be --at--

Signed and Sealed this

Twenty-fourth Day of February, 1998

Attest:

BRUCE LEHMAN

Attesting Officer

Commissioner of Patents and Trademarks